No. 704,059. Patented July 8, 1902.
W. J. LINTON.
HYDRAULIC AIR COMPRESSOR.
(Application filed Feb. 21, 1900.)
(No Model.) 3 Sheets—Sheet 3.
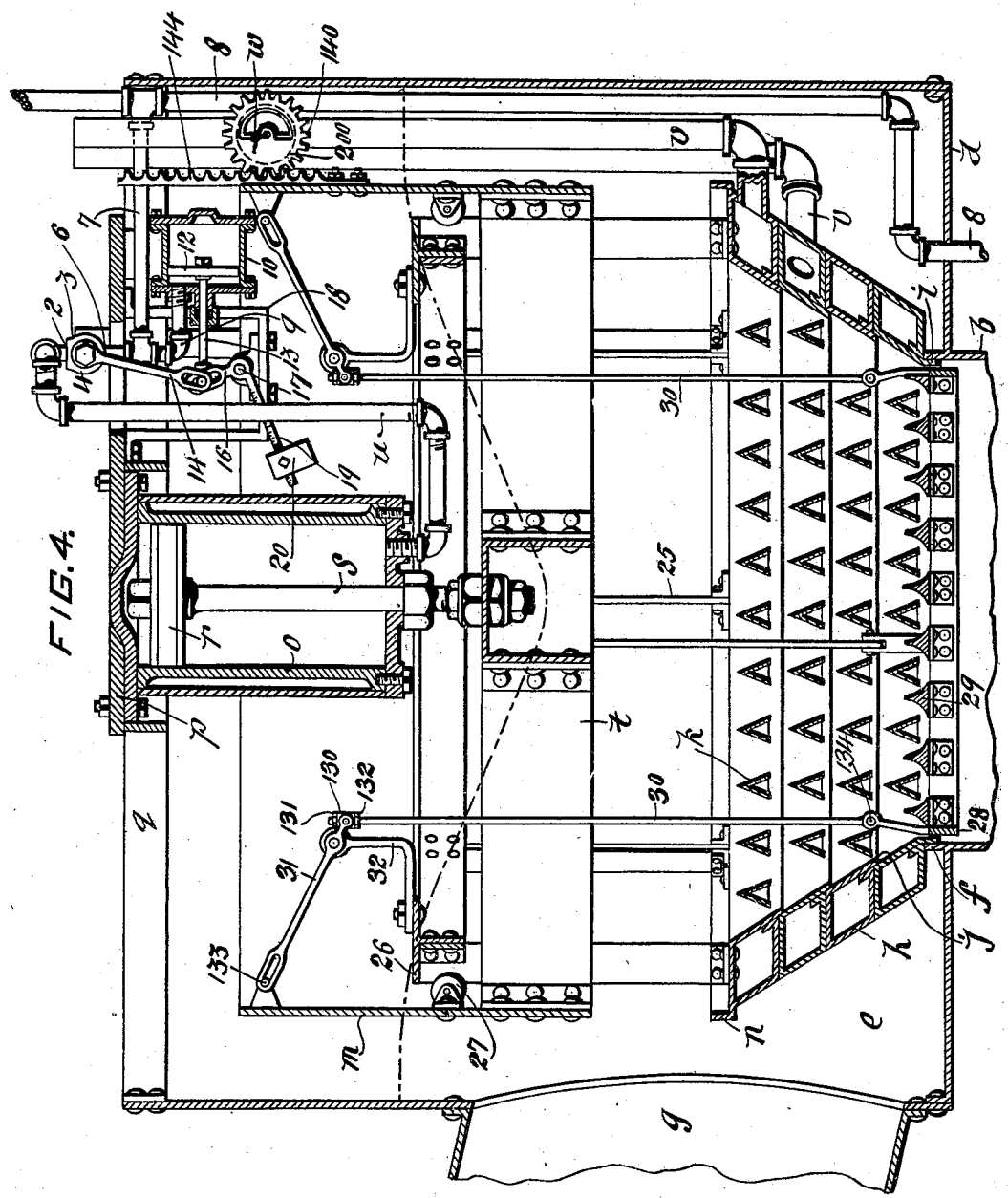
Witnesses
William J. Linton
Inventor
By his Attorney

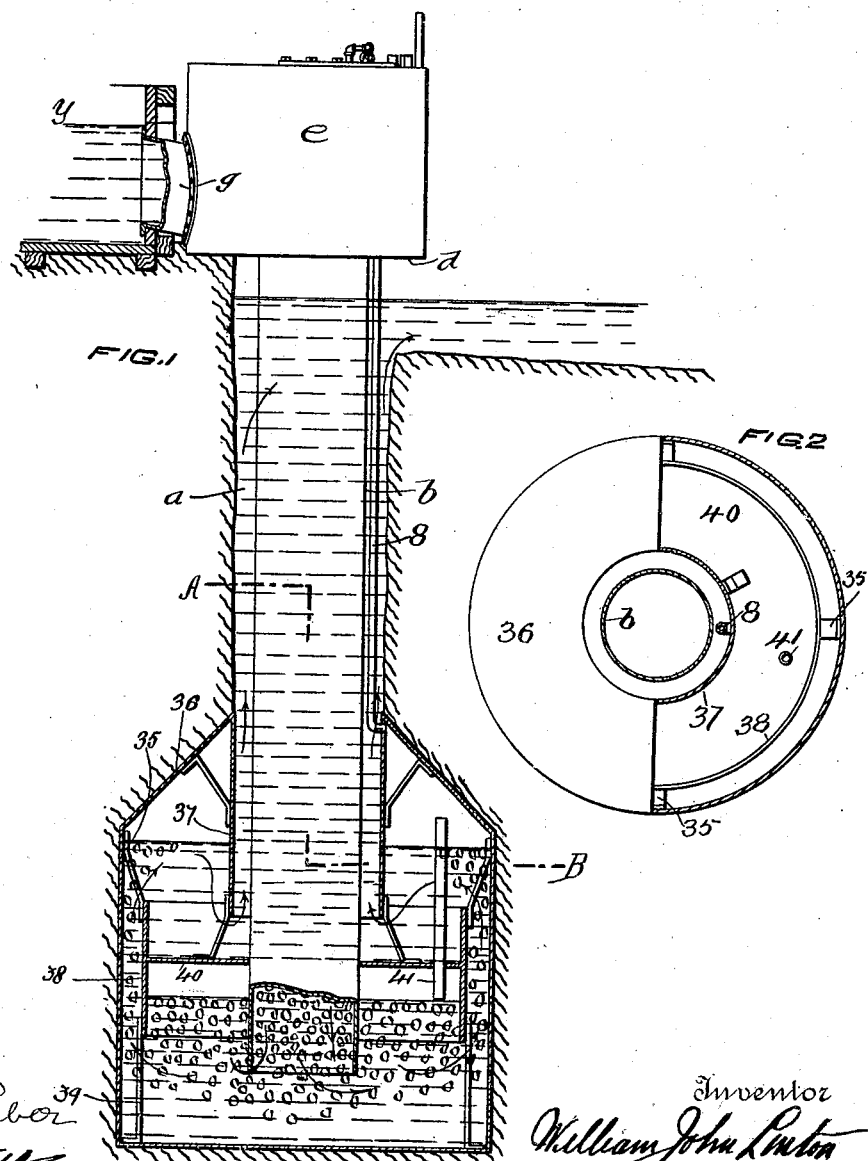

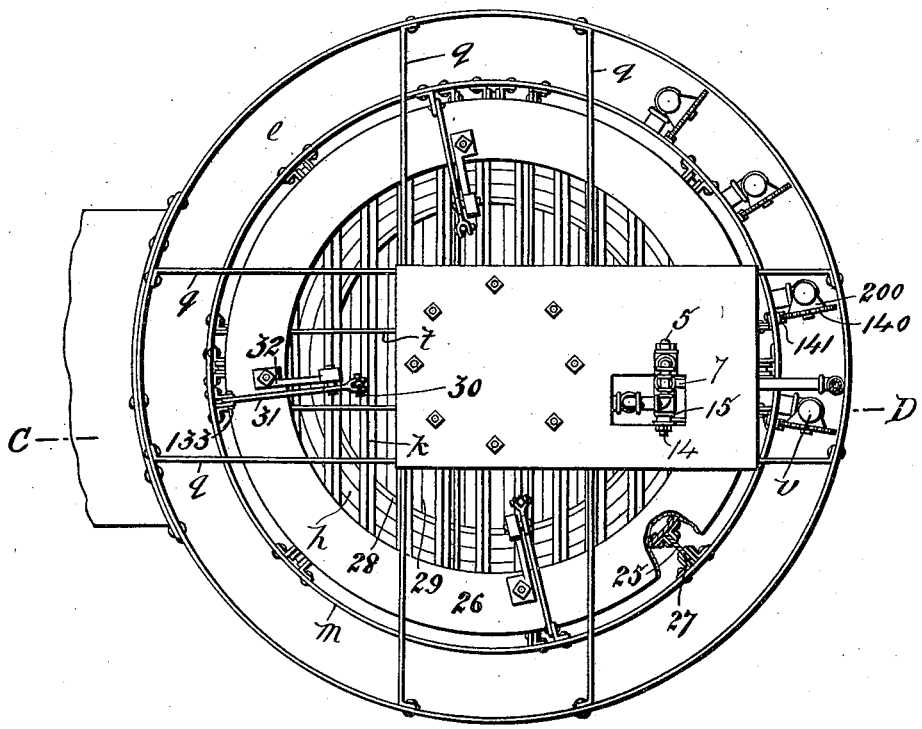
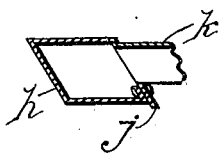

UNITED STATES PATENT OFFICE.

WILLIAM JOHN LINTON, OF WOODSTOCK, CANADA, ASSIGNOR TO THE TAYLOR HYDRAULIC AIR COMPRESSING COMPANY, LIMITED, OF MONTREAL, CANADA, A CORPORATION OF CANADA.

HYDRAULIC AIR-COMPRESSOR.

SPECIFICATION forming part of Letters Patent No. 704,059, dated July 8, 1902.

Application filed February 21, 1900. Serial No. 6,044. (No model.)

*To all whom it may concern:*

Be it known that I, WILLIAM JOHN LINTON, of the town of Woodstock, in the county of Oxford and Province of Ontario, Dominion of Canada, have invented certain new and useful Improvements in Hydraulic Air - Compressors; and I do hereby declare that the following is a full, clear, and exact description of the same.

My invention relates particularly to hydraulic air-compressors wherein the air is conducted to a separating or compressing chamber by a descending body of water; and it has for its object to provide a compressor the principal feature whereof will be that the working thereof and the consequent compression of air will depend upon the amount of the compressed air consumed, and, speaking generally, to provide a more efficient compressor than has been known heretofore.

The preferred embodiment of my invention consists of means for controlling the volume of water supplied to the stand-pipe, said means being automatically actuated through the medium of the air under compression in the separating-chamber when it varies from a predetermined normal pressure. I also provide means for controlling the direction of the flow of the water relatively to the air-supply ports, this latter means being preferably adjustable to accommodate different volumes of water and, besides, being automatically adjusted to the volume of water as it is regulated by the above-mentioned means.

I have discovered that one of the principal reasons for not securing the maximum efficiency of compressors of the type to which my invention relates is that the air-supply ports have not been of sufficient area, and in order to correct this and increase the efficiency of the compressor I form the conductor for the descending body of water with a flared upper end formed to constitute in the wall of said upper end a series of superimposed annular air-chambers, each communicating independently with the atmosphere through controlled air-passages. Each of these annular chambers has a series of air-bars communicating therewith at their ends and formed with air-exits at and preferably extending throughout their under sides. The separating-chamber is preferably located at the lower end of a shaft which serves as a conductor for the water in its return flow to the upper level. This chamber has a pair of subchambers located one above the other, with the lowermost above the lower end of the water-conductor and communicating with the upper subchamber by a pipe extending from a point within the lower subchamber and above the lower end of said conductor upwardly to the interior of the upper subchamber. A second pipe leads from the interior of the uppermost subchamber to a storage-tank or to the point of consumption, and the lower ends of both subchambers communicate with the conductors for the water as it descends and ascends.

I have found my improved plant particularly useful where the water-supply available is being utilized as a source of power to drive several other plants and where the unnecessary use of the water by any one plant is to the disadvantage of the other plants.

For full comprehension, however, of my invention reference must be had to the accompanying drawings, forming a part of this specification, in which like symbols indicate the same parts, and wherein—

Figure 1 is a side elevation of a hydraulic air-compressor constructed according to my invention and with the separating-chamber in vertical sectional view. Fig. 2 is a horizontal sectional view taken on line A B, Fig. 1, and illustrating particularly the separating-chamber. Fig. 3 is an enlarged plan view of the upper end of my improved compressor. Fig. 4 is a vertical sectional view of the head-piece, taken on line C D, Fig. 3. Fig. 5 is a detail view illustrating the point of one of the air-bars with an annular air-chamber.

$a$ is the shaft, and $b$ the stand-pipe. The upper end of stand-pipe $b$ projects a short distance above the floor $d$ of the cylindrical water-receiving chamber $e$ to form a flange $f$, and this chamber $e$ is connected to the dam $y$ by a flume $g$. A series of hollow annular sections $h$, preferably outwardly inclined and of progressively-increasing diameter from the lowermost upward to give a flared formation to the said upper end of the stand-pipe, are superimposed one with the other. The lower inner edge of each section $h$ is formed with a depending flange, the flange $i$ of the lowermost section being vertically arranged to fit into the flanged upper end $f$ of the stand-pipe and the flange $j$ of each of the superimposed sections being inclined to fit into the respective sections that support them. A series of horizontally-arranged bars $k$ of inverted-V cross-section are secured in correspondingly-shaped openings in the inner wall of each of these sections $h$ and an air-supply pipe $v$ communicating at its lower end with the interior of said bars and leads therefrom upwardly and is closed at its upper end. Each pipe has a damper $w$ to control an opening in a lateral extension 200 thereof, near its upper end, the function of these dampers being to regulate the draft of air through the pipes $v$, and each damper $w$ is automatically operated by a pinion 140, formed in one therewith and rotated by a rack 141, to be presently described. A vertically-movable cylindrical section $m$ at times rests upon the top of the uppermost section $h$, where it is localized by an upwardly-projecting flange $n$ and is of a height to have its upper edge extend above the highest water-level attainable in the dam. This cylindrical section $m$ constitutes a valve for controlling or cutting off completely the flow of water into the stand-pipe, and for actuating this valve to this purpose I secure a cylinder $o$ to a plate $p$, mounted upon girders $q$, secured at their ends rigidly to the upper end of the wall of the water-receiving chamber $e$. A piston $r$ is located in this cylinder $o$, and its piston-rod $s$ is connected at its lower end to the valvular cylinder $m$ by means of a series of girders $t$, connected rigidly at their ends to said cylinder $m$. The vertical rack 141, before mentioned, is rigidly secured to the cylindrical section $m$, adjacent to each valve-pinion 140, with which it intermeshes. The lower end of the interior of this cylinder $o$ is in communication through a pipe $u$ with one, 2, of the ports in the casing 3 of a three-way valve 4, the other two ports 5 and 6 whereof communicate, respectively, with the atmosphere and with a T-pipe, one branch 7 whereof is connected to the pipe 8, leading from the separating-chamber, to be presently described, and the other branch 9 to one end of a horizontal cylinder 10. A piston 12 is located within this cylinder 10 and is connected by a piston-rod 13 to one end of a lever 14, the other end whereof is operatively connected to the stem of a rotatable plug-valve 15 for controlling the ports of said casing 3. The outer end of the piston-rod 13 is also connected to an arm 16 of a bell-crank lever, fulcrumed, as at 17, to a bracket 18, hung from the plate $p$, the other arm 19 of said bell-crank lever being graduated in the form of a beam and carrying an adjustable counterpoise 20.

The valvular cylindrical section $m$ is guided in its vertical movement by a series of vertical rails 25, braced rigidly together at their upper ends by a ring 26 of T cross-section, while a series of antifriction-rollers 27, carried by the interior of said section $m$, run upon said rails 25.

In order to deflect the water descending through the spaces between the lowermost series of bars $k$ to as nearly as possible envelop the open under side of said bars, I provide a deflector of novel construction and adapt it to be automatically actuated in conjunction with the valvular cylinder $m$ to augment said valvular cylinder in its control of the volume of water to pass through the stand-pipe. This deflector-controller consists of a ring 28, fitting within the upper end of the stand-pipe and having secured rigidly thereto a series of horizontally-arranged bars 29 of triangular cross-section with concave upper sides. The upper edges of these bars 29 extend parallel to and are located between the bars $k$. This deflector is supported by four rods 30, each pivotally and adjustably hung from the end of a lever 31, fulcrumed to a bracket 32, secured to the circular T bar 26, and the other end of each lever is pivotally connected to the interior of the cylindrical valvular section $m$, as at 133. The pivotal adjustable connection between the inner ends of these levers 31 and the rods 30 is effected by means of a sleeve 130, pivotally connected to said inner ends, which are forked. The upper ends of the rods 30 are screw-threaded and passed through these sleeves and have localizing-nuts 131 and jam-nuts 132 therein, these rods being pivotally connected at their ends, as at 134, to the ring 28. By this connection the rods and through them the deflector can be adjusted to either almost completely close the spaces between the bars $k$ when the valvular section $m$ is at its extreme height or to leave a space, as shown in Fig. 4. It is obvious that by means of the above construction the deflecting-bars 29 will be automatically moved toward or away from the air-bars $k$, thereby diminishing or increasing the space for the passage of the descending water between said bars as the volume of water decreases or increases and at the same time causing said water to as nearly as possible envelop the open lower side of the lower series of said bars, and it is further obvious that the rise and fall of this valvular cylindrical section $m$ will, through the racks and pinions, automatically open and close the controlling-valves of the air-supplying pipes.

The separating-chamber consists of a dome 35, having a truncated conical top 36. The opening in this conical top corresponds in diameter to that of the shaft $a$ and is of greater diameter than the stand-pipe $b$, and a tubular section 37 is connected at its upper end to the edges of said opening and projects downwardly into the chamber formed by said dome. A cylindrical section 38 of less diameter than the interior of the chamber, but of greater diameter than the said downwardlyprojecting tubular section, is supported by legs 39 within the chamber, said cylindrical section 38 being of a height to have its upper edge a short distance above the lower end of the tubular section 37, while the lower edge thereof is a short distance above the lower end of the stand-pipe b. This cylindrical section is divided by a horizontal diaphragm 40, which is secured at its periphery to the interior of the said cylindrical section and has a central opening to allow the passage therethrough of the stand-pipe which is connected thereto.

A short air-conducting pipe 41 leads from the space constituting a subchamber below the diaphragm 40 to the space constituting a second subchamber between the tubular section 37 and the interior of the conical top of the main chamber, and the main air-conducting pipe 8 is connected to an opening in side of said tubular section and leads to a storage-tank, to a point of consumption, or elsewhere, as required.

The operation of my invention is as follows: It must first be ascertained what working pressure is necessary to supply the power required for the work to be done by the plant. It is obvious that any power generated more than is necessary for the work to be done is superfluous and waste energy. Consequently to limit the generating-power of the plant to the work to be done will obviate this waste of energy and allow it to be utilized for other purposes. Let it be supposed that a normal working pressure of ninety pounds is required. The counterpoise 20 should then be moved along the beam 19 to the corresponding mark thereon. The air-charged water descends the stand-pipe b and turns from the lower end thereof and ascends into the first subchamber, where the major portion of the air, due to its natural buoyancy, will free itself from the water. The water then, with whatever air-globules may be still conveyed thereby, rises into the second subchamber, where the water will be completely freed of the air-globules and will then ascend the tubular section 37 and the shaft and flow away. Meanwhile when sufficient air has been supplied to the first subchamber to displace the water until its surface within said side chamber is below the lower end of the air-pipe air will be discharged under compression into the second subchamber, from which it is delivered for consumption, as before mentioned, through pipe 8. As the pressure of air in the pipe 8, leading from the separating-chamber, overcome, the weight of the valvular cylindrical section m, the piston r, and the intermediate connections therebetween such parts will be raised to the position shown in Fig. 4 and the full volume of water allowed to descend. If, however, the pressure in pipe 8 exceeds ninety pounds, the counterpoise 20 will be overcome and the piston 12, and with it the lever 14, moved. This will cut the communication between the pipe 8 and the cylinder o and establish a communication between said cylinder o and the exhaust-port of the three-way valve, thereby allowing the valvular cylindrical section m to fall and cut off the water-supply until normal pressure within the plant is restored, after which the valve m will be again lifted, as before mentioned.

When the compressor is being constructed, the valvular cylindrical section m is supported by any suitable means (not shown) that can be easily removed after operation has commenced.

It is obvious that for the purposes of repairs or for other reasons any one of the air-supplying sections or several of them can be removed without disturbing the remainder.

I do not herein claim the system herein disclosed of establishing the downward and upward or return flow of a column of water and separating the air contained therein from the upward or return portion of such column, as such system forms the subject-matter of an application filed by me on the 3d day of December, 1900, under No. 38,542; neither do I herein broadly claim the means for regulating the power of compression of my compressor to a predetermined normal nor the means for automatically controlling the air-supply to said compressor, as they form the subject-matter of an application filed by me on the 5th day of December, 1900, under No. 383,849.

What I claim is as follows:

1. In a hydraulic air-compressor, a pair of subchambers located one above the other, a vertical water-conduit communicating at its lower end with the lower subchamber; a water-passage leading from said lower to said upper subchambers; a water-conduit leading from the upper subchamber to the overflow of the compressor; an air-pipe leading from the lower to the upper subchambers and an air-pipe leading from the upper subchamber to the point of consumption.

2. In a hydraulic air-compressor, a pair of subchambers located one above the other; a vertical water-conduit communicating at its lower end with the lower subchamber at a point a short distance from the lower end thereof; a water-passage leading from said lower to said upper subchamber; a water-conduit leading from the upper subchamber to the overflow of the compressor; an air-pipe leading from the lower to the upper subchamber; and an air-pipe leading from the upper subchamber to the point of consumption, substantially as described and for the purpose set forth.

3. In a hydraulic air-compressor, a pair of subchambers located one above the other; a vertical water-conduit communicating at its lower end with the lower subchamber at a point a short distance from the lower end thereof; a water-passage leading from a short distance above the level of the lower end of said vertical water-conduit in said lower subchamber to a point above the lower end of said upper subchamber; a water-conduit leading from a point in the upper subchamber slightly below the upper end of the said water-passage to the overflow of the compressor; an air-pipe leading from the lower to the upper subchamber; and an air-pipe leading from the upper subchamber to the point of consumption, substantially as described and for the purpose set forth.

4. In a hydraulic air-compressor, a pair of subchambers located one above the other; a vertical water-conduit communicating at its lower end with the lower subchamber at a point a short distance from the lower end thereof; a water-passage leading from said lower to said upper subchamber; a water-conduit leading from the upper subchamber to the overflow of the compressor; an air-pipe leading from a point in the lower subchamber intermediate the top thereof and the lower end of said water-passage to a point in the upper subchamber intermediate the top thereof, and the upper end of said water-passage; and an air-pipe leading from the upper end of the upper subchamber to the point of consumption, substantially as described and for the purpose set forth.

5. In a hydraulic air-compressor, a pair of subchambers located one above the other; a vertical water-conduit communicating at its lower end with the lower subchamber at a point a short distance from the lower end thereof; a water-passage leading from a short distance above the level of the lower end of said vertical water-conduit in said lower subchamber to a point above the lower end of said upper subchamber; a water-conduit leading from a point in the upper subchamber slightly below the upper end of the said water-passage to the overflow of the compressor; an air-pipe leading from a point in the lower subchamber intermediate the top thereof and the lower end of said water-passage to a point in the upper subchamber intermediate the top thereof and the upper end of said water-passage; and an air-pipe leading from the upper end of the upper subchamber to the point of consumption, substantially as described and for the purpose set forth.

6. A hydraulic air-compressing apparatus having a vertical stand-pipe for conducting the water downwardly a dome inclosing the lower end of said stand-pipe and interiorly divided to form a pair of subchambers located one above and adjacent to the other said lower subchamber having its lower end open and said upper subchamber having its upper end open; an air-pipe leading from the lower to the upper subchamber, a second air-pipe leading from the upper subchamber to the point of consumption, and a water-conductor leading upwardly from the dome, substantially as described and for the purpose set forth.

7. A hydraulic air-compressing apparatus having a vertical stand-pipe for conducting the water downwardly, a dome inclosing the lower end of said stand-pipe and interiorly divided to form a subchamber above and adjacent to the lower end of said stand-pipe, said subchamber having its lower end open; a truncated conical top upon said dome; a water-passage leading from said subchamber to the space in the dome above said subchamber; a tubular section connected at its upper end to the edge of the opening in said truncated top and extending downwardly into said dome to close proximity to said subchamber; an air-pipe leading from the subchamber to the space between said tubular section and the top of the dome; a second air-pipe leading from the said space between the tubular section and the top of the dome to the point of consumption, and a water-conductor leading upwardly from the upper end of said tubular section, substantially as described and for the purpose set forth.

8. A hydraulic air-compressing apparatus having a vertical stand-pipe for conducting the water downwardly, a dome located at and inclosing the lower end of said stand-pipe and having a truncated conical top; a vertically-arranged cylindrical section with open ends supported in said dome above the lower end of said stand-pipe and of sufficiently less diameter than said dome to provide a vertical passage therebetween and said dome, a horizontal diaphragm dividing said cylindrical section midway of its height; a tubular section connected at its upper end to the edge of the opening in the top of the dome and extending downwardly a short distance below the upper edge of the cylindrical section, an air-pipe leading from a point a short distance above the lower end of said cylindrical section upwardly to the space between said tubular section and the top of the dome; and a second air-pipe leading from said space to the point of consumption, substantially as described and for the purpose set forth.

9. The combination with a water-conductor, of an air-supplying bar and means for supplying air to said bar, said bar being arranged transversely of the said conductor and adapted to supply air throughout one side thereof to the body of water traveling through said conductor.

10. In a hydraulic air-compressor of the class described, the combination with the water-conductor, of an air-supplying bar and means for supplying air to said bar, said bar being arranged transversely of the said conductor and adapted to supply air throughout one side thereof to the body of water traveling through said conductor to provide an air-supply of extended area.

11. In a hydraulic air-compressor of the class described, the combination with the water-conductor, of an air-supplying bar, and a valve-controlled pipe for supplying air to said bar, said bar being arranged transversely of the said conductor and adapted to supply air throughout one side thereof to the body of water traveling through said conductor to provide an air-supply of extended area.

12. In a hydraulic air-compressor of the class described, the combination with the water-conductor of an air-supplying bar of V cross-section and extending transversely of said conductor with its open side facing the exit end of said conductor, substantially as and for the purpose set forth.

13. The combination with a water-conductor, of an air-supplying section consisting of a hollow annular part; a series of air-conducting bars extending transversely of and communicating at their ends with said annular part, and having air-exits in their sides facing the direction of water-flow; and an air-conducting pipe connected to said annular part.

14. In a hydraulic air-compressor of the class described, the combination with the water-conductor of an air-supplying section consisting of a hollow annular part resting upon the upper end of said water-conductor; a series of air-conducting bars extending transversely of and communicating at their ends with said annular part, and having air-exits in their under sides; and an air-conducting pipe communicating with the atmosphere at its upper end and connected to said annular part at its lower end, substantially as described and for the purpose set forth.

15. In a hydraulic air-compressor of the class described, the combination with the water-conductor of an air-supplying section consisting of a hollow annular part resting upon the upper end of said water-conductor; a series of air-conducting bars extending transversely of and communicating at their ends with said annular part and having air-exits in their under sides; an air-conducting pipe communicating with the atmosphere at its upper end and connected to said annular part at its lower end and a damper for controlling said pipe, substantially as described and for the purpose set forth.

16. In a hydraulic air-compressor of the class described, the combination with the water-conductor of an air-supplying section consisting of a hollow annular part resting upon the upper end of said water-conductor; a series of air-conducting bars of V cross-section arranged with their open sides facing downwardly and extending transversely of and communicating at their ends with said annular part; and an air-conducting pipe communicating with the atmosphere at its upper end and connected to said annular part at its lower end, substantially as described and for the purpose set forth.

17. In a hydraulic air-compressor of the class described, the combination with the water-conductor of an air-supplying section consisting of a hollow annular part resting upon the upper end of said water-conductor; a series of air-conducting bars of V cross-section arranged with their open sides facing downwardly and extending transversely of and communicating at their ends with said annular parts; an air-conducting pipe communicating with the atmosphere at its upper end and connected to said annular part at its lower end and a damper for controlling said pipe, substantially as described and for the purpose set forth.

18. In an air-compressor of the class described, the combination with the stand-pipe, of a series of horizontally-arranged air-supplying sections superimposed one upon the other, and an independent air-conducting pipe leading to each section, substantially as and for the purpose set forth.

19. In an air-compressor of the class described, the combination with the stand-pipe, of a series of horizontally-arranged air-supplying sections superimposed one upon the other, an independent air-conducting pipe leading to each section, and a damper for controlling each pipe, substantially as and for the purpose set forth.

20. In an air-compressor of the class described, the combination with the stand-pipe, of a series of horizontally-arranged air-supplying sections superimposed one upon the other, each section consisting of a hollow annular part and a series of air-conducting bars extending transversely of and communicating at their ends with said annular part and having air-exits in their under sides; and an independent air-conducting pipe leading to each section, substantially as and for the purpose set forth.

21. In an air-compressor of the class described, the combination with the stand-pipe, of a series of horizontally-arranged air-supplying sections superimposed one upon the other, each section consisting of a hollow annular part and a series of air-conducting bars of V cross-section arranged with their open sides facing downward extending transversely of and communicating at their ends with said annular part, and an independent air-conducting pipe leading to each section, substantially as and for the purpose set forth.

22. In an air-compressor of the class described, the combination with the stand-pipe of a series of horizontally-arranged air-supplying sections superimposed one upon the other, each section consisting of a hollow annular part and a series of air-conducting bars of V cross-section arranged with their open sides facing downward extending transversely of and communicating at their ends with said annular part; an independent air-conducting pipe leading to each section, and a damper for controlling each pipe, substantially as and for the purpose set forth.

23. In a hydraulic air-compressor comprising a descending body of water, a series of air-supplying devices immersed at their lower ends in said descending body of water and communicating at their upper ends with the atmosphere, and means for deflecting said water to flow across and in close proximity to the air-egress ports of said devices, for the purpose set forth.

24. In a hydraulic air-compressor comprising a descending body of water, a series of air-supplying devices immersed at their lower ends in said descending body of water and communicating at their upper ends with the atmosphere, and adjustable means for deflecting said water as it varies in volume to flow across and in close proximity to the air-egress ports of said devices, for the purpose set forth.

25. In a hydraulic air-compressor comprising a descending body of water, a series of air-supplying devices immersed at their lower ends in said descending body of water and communicating at their upper ends with the atmosphere, means for automatically controlling the passage of air through the air-egress ports of said devices, for the purpose set forth.

26. In a hydraulic air-compressor comprising a descending body of water, a series of air-bars of V cross-section arranged parallel to one another with their open sides facing downwardly and in the same horizontal plane, means for supplying air to said bars, and means located between the lower sides of said bars for deflecting the descending water to flow across and in close proximity to said open sides, substantially for the purpose set forth.

27. In a hydraulic air-compressor comprising a descending body of water, a series of air-bars of V cross-section arranged parallel to one another with their open sides facing downwardly and in the same horizontal plane, means for supplying air to said bars, and vertically-adjustable means located between the lower sides of said bars for deflecting the descending water to envelop said open sides, for the purpose set forth.

28. In a hydraulic air-compressor comprising a descending body of water, a series of air-bars of V cross-section arranged parallel to one another with their open sides facing downwardly and in the same horizontal plane, means for supplying air to said bars, and means located between the lower sides of said bars for deflecting the descending water to envelop said open sides, said deflecting means consisting of a ring, a series of bars triangular in cross-section with concave upper sides and set rigidly at their ends in said ring, and means for supporting said ring, substantially as and for the purpose set forth.

29. In a hydraulic air-compressor comprising a descending body of water, a series of air-bars of V cross-section arranged parallel to one another with their open sides facing downwardly and in the same horizontal plane, means for supplying air to said bars, and automatically vertically adjustable means located between the lower sides of said bars for deflecting the descending water to envelop said open sides, for the purpose set forth.

30. In a hydraulic air-compressor comprising a descending body of water, a series of air-bars of V cross-section arranged parallel to one another with their open sides facing downwardly and in the same horizontal plane, means for supplying air to said bars, and means located between the lower sides of said bars for deflecting the descending water to envelop said open sides, said deflecting means consisting of a ring, a series of bars triangular in cross-section with concave upper sides and set rigidly at their ends in said ring, and vertically-adjustable means for supporting said ring, substantially as and for the purpose set forth.

31. In a hydraulic air-compressor comprising a descending body of water, a series of air-bars of V cross-section arranged parallel to one another with their open sides facing downwardly and in the same horizontal plane, means for supplying air to said bars, and means located between the lower sides of said bars for deflecting the descending water to envelop said open sides, said deflecting means consisting of a ring, a series of bars triangular in cross-section with concave upper sides set rigidly at their ends in said ring, and vertically-adjustable rods for supporting said ring and means for adjusting said rods, substantially as and for the purpose set forth.

32. In a hydraulic air-compressor comprising a descending body of water, a series of air-bars of V cross-section arranged parallel to one another with their open sides facing downwardly and in the same horizontal plane, means for supplying air to said bars, and means located between the lower sides of said bars for deflecting the descending water to envelop said open sides, said deflecting means consisting of a ring, a series of bars triangular in cross-section with concave upper sides and set rigidly at their ends in said ring, means for supporting said ring, and means for automatically vertically adjusting said supporting means, substantially as and for the purpose set forth.

33. In a hydraulic air-compressor comprising a descending body of water, a series of air-bars of V cross-section arranged parallel to one another with their open sides facing downwardly and in the same horizontal plane, means for supplying air to said bars, and means located between the lower sides of said bars for deflecting the descending water to envelop said open sides, said deflecting means consisting of a ring, a series of bars triangular in cross-section concave upper sides and set rigidly at their ends in said ring, and vertically-adjustable rods for supporting said ring and means for automatically adjusting said rods, substantially as and for the purpose set forth.

34. In combination with the stand-pipe of a hydraulic air-compressor of the class described, a valvular cylindrical section of a diameter to rest upon the top of said stand-pipe, and means for adjusting said valvular section to and from said stand-pipe, for the purpose set forth.

35. In combination with the stand-pipe of a hydraulic air-compressor of the class described, a valvular cylindrical section of a diameter to rest upon the top of said stand-pipe and means under control of the air compressed by said compressor for automatically adjusting said valvular section to and from said stand-pipe, substantially as and for the purpose set forth.

36. In a hydraulic air-compressor, the combination with the stand-pipe thereof and the pipe for conducting the compressed air therefrom, of a valvular cylindrical section of a diameter to rest upon the top of said stand-pipe; a vertical cylinder; means for supporting said vertical cylinder above said annular section; a piston within said vertical cylinder; a piston-rod connected at its upper end to said piston and at its lower end to said valvular section; a three-way valve; a branch pipe connecting the lower end of said vertical cylinder to one of the ports of said three-way valve; a second branch pipe connecting another of the ports of said three-way valve to the said compressed-air conducting-pipe; a horizontal cylinder located adjacent to said three-way valve; a piston within said last-mentioned cylinder; a piston-rod connected at one end to said last-mentioned piston; a bell-crank lever; means for supporting said bell-crank lever; one of the arms of said bell-crank lever being connected to the outer end of said last-mentioned piston-rod, the other arm of said bell-crank lever being elongated and graduated in the form of a beam and having a counterpoise movable longitudinally thereon; a lever connected rigidly at one end to the valve-stem of said three-way valve and at its other end to the outer end of said last-mentioned piston-rod; a branch pipe connecting said second branch pipe to said horizontal cylinder; and means for guiding said valvular cylindrical section in its movement to and from the top of the stand-pipe; substantially as described and for the purpose set forth.

In testimony whereof I have affixed my signature in presence of two witnesses.

WILLIAM JOHN LINTON.

Witnesses:
 FRED J. SEARS,
 ARTHUR S. BAKER.